(12) United States Patent
Kim

(10) Patent No.: US 9,160,826 B2
(45) Date of Patent: Oct. 13, 2015

(54) DOCKING STATION FOR PORTABLE COMMUNICATION DEVICE

(75) Inventor: Se-Jin Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 33 days.

(21) Appl. No.: 13/214,612

(22) Filed: Aug. 22, 2011

(65) Prior Publication Data

US 2012/0057294 A1   Mar. 8, 2012

(30) Foreign Application Priority Data

Sep. 6, 2010  (KR) .................... 20-2010-0009334 U

(51) Int. Cl.
| | |
|---|---|
| G06F 1/16 | (2006.01) |
| H05K 7/00 | (2006.01) |
| H04M 1/04 | (2006.01) |
| H02J 7/00 | (2006.01) |

(52) U.S. Cl.
CPC ............... *H04M 1/04* (2013.01); *G06F 1/1632* (2013.01); *H02J 7/0044* (2013.01)

(58) Field of Classification Search
CPC .............................. G06F 1/1632; H02J 7/0044
USPC .......... 361/679.41–679.44; 320/115; 439/527
See application file for complete search history.

(56) References Cited

U.S. PATENT DOCUMENTS

| | | | |
|---|---|---|---|
| 6,193,546 B1* | 2/2001 | Sadler ........................... | 439/534 |
| 7,580,255 B2* | 8/2009 | Crooijmans et al. ...... | 361/679.56 |
| 7,643,283 B2* | 1/2010 | Jubelirer et al. .......... | 361/679.41 |
| 7,782,012 B2* | 8/2010 | Jo ................................ | 320/115 |
| 8,083,195 B2* | 12/2011 | Osada ......................... | 248/274.1 |
| 8,115,451 B2* | 2/2012 | Griffin, Jr. .................... | 320/115 |
| 8,139,353 B2* | 3/2012 | Slaby et al. .............. | 361/679.41 |
| 2004/0057199 A1* | 3/2004 | Azuchi ......................... | 361/683 |
| 2005/0255895 A1* | 11/2005 | Lee et al. ...................... | 455/573 |
| 2006/0250764 A1* | 11/2006 | Howarth et al. .............. | 361/683 |
| 2007/0182372 A1* | 8/2007 | Yang ............................ | 320/114 |
| 2009/0015198 A1* | 1/2009 | Brandenburg ................ | 320/115 |
| 2009/0073642 A1 | 3/2009 | Jubelirer et al. | |

FOREIGN PATENT DOCUMENTS

KR   10-2006-0026280 A   3/2006

* cited by examiner

*Primary Examiner* — Anatoly Vortman
*Assistant Examiner* — Jacob Crum
(74) *Attorney, Agent, or Firm* — Cha & Reiter, LLC.

(57) ABSTRACT

A docking station for a portable communication device includes a body portion and a guide portion which is formed to accommodate various exterior shapes of the portable communication device and detachably coupled to the portable communication device.

11 Claims, 4 Drawing Sheets

DOCKING STATION FOR PORTABLE COMMUNICATION DEVICE

CLAIM OF PRIORITY

This application claims the benefit under 35 U.S.C. §119 of a Korean Patent Application filed in the Korean Intellectual Property Office on Sep. 6, 2010 and assigned Serial No. 20-2010-0009334, the entire disclosure of which is hereby incorporated by reference.

BACKGROUND OF THE INVENTION

1. Field of the Invention

The present invention relates to a docking station for a portable communication device provided with a guide portion that is formed to fit various exterior shapes of the portable communication device and to be detachable coupled to the docking station.

2. Description of the Related Art

Generally, "portable communication devices" enable wireless communication while the devices are being carried around. The portable communication devices include a handheld phone (HHP), a cordless telephone (CT-) 2 cellular phone, a digital phone, a personal communications systems (PCS) phone, and a personal digital assistant (PDA), etc. The wireless terminals are typically classified into a bar type, a flip type, a folder type, and a sliding type according to their shapes. These portable terminals include an antenna apparatus, a data input/output device such as a touch screen, and a data transceiver.

Unlike a Personal Computer (PC), the portable communication device is not equipped with parts such as a local printer, a backup drive, and a mass storage device. Thus, the portable communication device needs a docking station for connection to other accessory parts. The docking station includes a hardware device and a series of connecting interfaces for engaging with external devices.

As shown in FIG. 1, a docking station 2 includes a slot 2a formed to fit for the shape of a portable communication device 1 and a connecting terminal 2b connecting the portable communication device 1 via the slot 2a.

When the portable communication device 1 is electrically connected to the slot 2a of the docking station 2, a user can use a charging device, an external memory device, a local printer, and the like. When moving to other places, the user may detach the portable communication device 1 from the slot 2a to use the portable communication device 1 in corresponding places.

However, a docking station for a conventional portable communication device has a slot formed to fit for the exterior shape of the portable communication device, such that the slot cannot be used for a portable communication device having different exterior shape.

Moreover, to use a portable communication device having different shape, a separate docking station having a slot formed to fit for that particular shape is required, increasing a cost of a product.

Accordingly, there is a need for a single docking station that can house and accommodate portable communication devices having various exterior shapes.

SUMMARY OF THE INVENTION

Accordingly, an aspect of the present invention is to provide a docking station for a portable communication device in which is provided a guide portion that is formed to adoptively house and detachably coupled to various exterior shapes of the portable communication device, thereby making it possible to use portable communication devices having various exterior shapes through a single docking station.

Another aspect of the present invention is to provide a docking station for a portable communication device in which is provided a cradling portion that allows portable communication devices having various exterior shapes to be directly mounted on or dismounted from a single docking station, thereby making it possible to use portable communication devices having various exterior shapes and thus improving efficiency in using a product.

According to an aspect of the present invention, there is provided a docking station for a portable communication device. The docking station includes a body portion of the docking station and a guide portion which is formed to fit various exterior shapes of the portable communication device, to be detachable from the portable communication device, and to be separated from or coupled to the body portion.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE INVENTION

Figure 1:
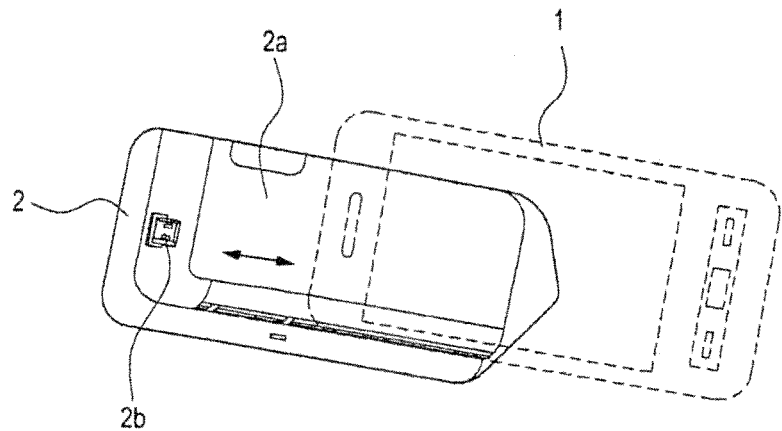
FIG. 1 is a perspective view showing a conventional docking station.

Hereinafter, an exemplary embodiment of the present invention will be described in detail with reference to the accompanying drawings. The embodiment disclosed in the specification and structures shown in the drawings are merely exemplary ones of the present invention, and it should be understood that various variations capable of substituting for the embodiment may exist at the time of filing the application.

Referring to FIGS. 2 through 5, a docking station 10 for a portable communication device 1 according to the present invention includes a docking station having a body portion 20 and a guide portion 30. The body portion 20 allows the guide portion 30 coupled with the portable communication device 1 to be mounted thereon or dismounted therefrom. The guide portion 30 is formed to fit and house various exterior shapes of the portable communication device 1 and to be detachable from the portable communication device 1. That is, when coupled with the portable communication device 1, the guide portion 30 can be separated from or coupled to the body portion 20.

As shown in FIGS. 2 through 5, in the body portion 20 is formed a cradling portion 23 to allow the guide portion 30 to be mounted thereon or dismounted therefrom while supporting the guide portion 30 such that the guide portion 30 can be inclinedly cradled on the cradling portion 23 when the body portion 20 is coupled with the guide portion 30. The cradling portion 23 is substantially formed in a "V" shape to inclinedly cradle the guide portion 30 thereon. The cradling portion 23 includes a connecting terminal 23a for electric connection with an interface (not shown) included in the portable communication device 1 when coupled to the guide portion 30.

Further, in the guide portion 30 is formed a terminal through-hole 33 which allows the connecting terminal 23a to pass therethrough for electric connection with the interface (not shown) of the portable communication device 1 when the portable communication device 1 is coupled with the guide portion 30. The guide portion 30 is formed to fit the exterior shape of the portable communication device 1, thereby allowing the portable communication device 1 to be mounted on or dismounted from the guide portion 30.

The guide portion 30 includes a coupling portion 31 which is formed on a rear surface of the guide portion 30 to be separated from or contactly coupled with the body portion 20 through a coupling groove 21. Further, in the guide portion 30 is formed a mounting/dismounting recess 34 for allowing the portable communication device 1 to be mounted on or dismounted from the guide portion 30.

For illustrative purposes, the docking station 10 according to an embodiment of the present invention is applicable to the portable communication device 1. However, it should be noted that the teachings of the present invention is applicable to other portable communication devices having various exterior shapes such as a bar type, a folder type, a sliding type, a swing type, and so forth. Further, examples of the portable communication device 1 according to an embodiment of the present invention may include not only mobile communication terminals operating according to communication protocols corresponding to various communication systems, but also any information communication apparatuses and multimedia apparatuses such as Portable Multimedia Players (PMPs), MP3 players, navigations, game players, notebook computers, advertising boards, TVs, digital broadcasting players, Personal Digital Assistants (PDAs), smart phones, waterproof phones, and so forth, and their application apparatuses.

Hereinafter, a detailed description will now be made of an operating process of the docking station 10 for the portable communication device 1 according to an embodiment of the present invention structured as described above.

As shown in FIGS. 2 through 5, the docking station 10 for the portable communication device 1 includes the body portion 20 and the guide portion 30.

Figure 4:
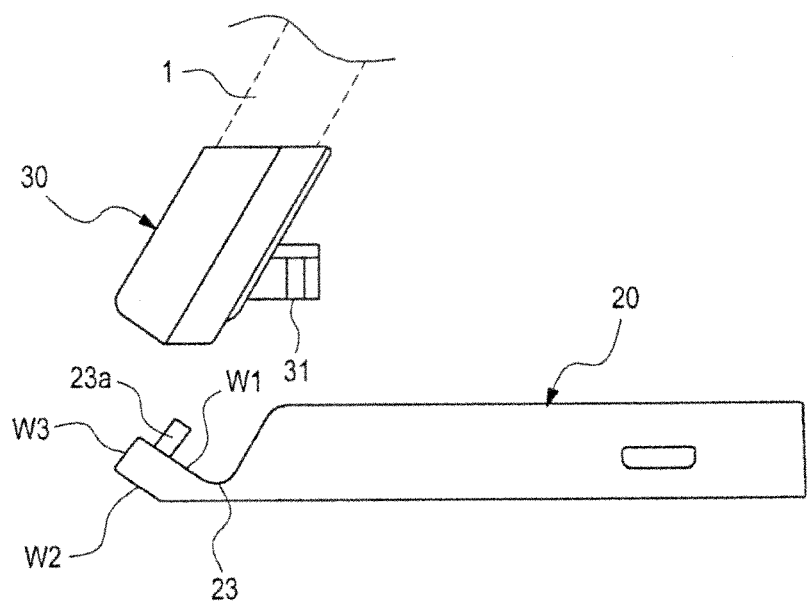
FIG. 4 is a side cross-sectional view showing a pre-coupled state (or before-coupled state) of a docking station for a portable communication device according to an exemplary embodiment of the present invention.
Figure 5:
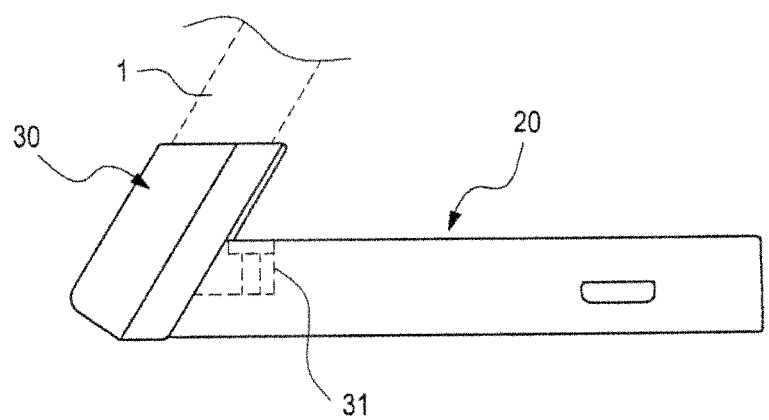
FIG. 5 is a side cross-sectional view showing a post-coupled state (or after-coupled state) of a docking station for a portable communication device according to an exemplary embodiment of the present invention.

In the body portion 20 is formed the cradling portion 23 which includes the connecting terminal 23a that electrically connects with the interface (not shown) of the portable communication device 1. In this state, as shown in FIGS. 2 through 5, when the portable communication device 1 is electrically connected to the docking station 10, the portable communication device 1 is coupled to the guide portion 30 and formed to fit for the exterior shape of the portable communication device 1. At this time, as shown in FIGS. 4 and 5, the coupling portion 31 formed in the guide portion 30 is coupled with the coupling groove 21 formed in the body portion 20.

Figure 2:
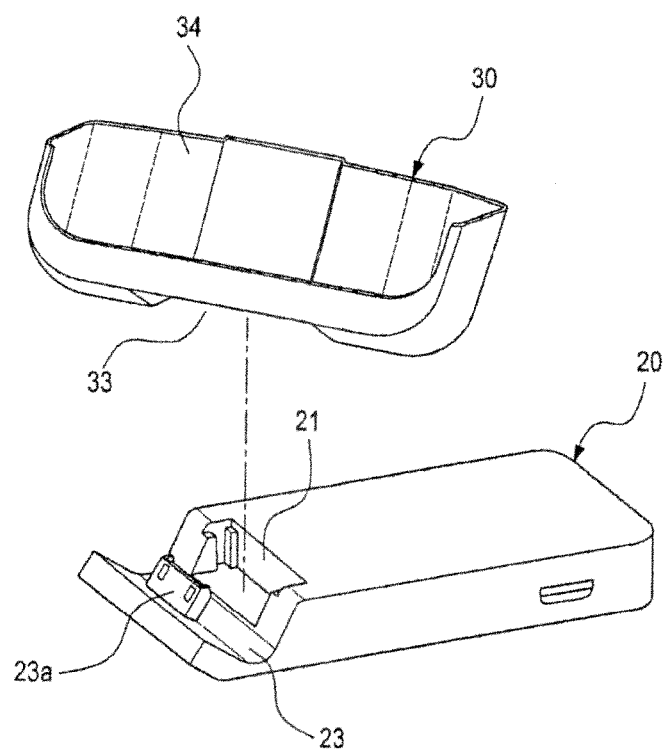
FIG. 2 is an exploded perspective view showing a docking station for a portable communication device according to an exemplary embodiment of the present invention.
Figure 3:
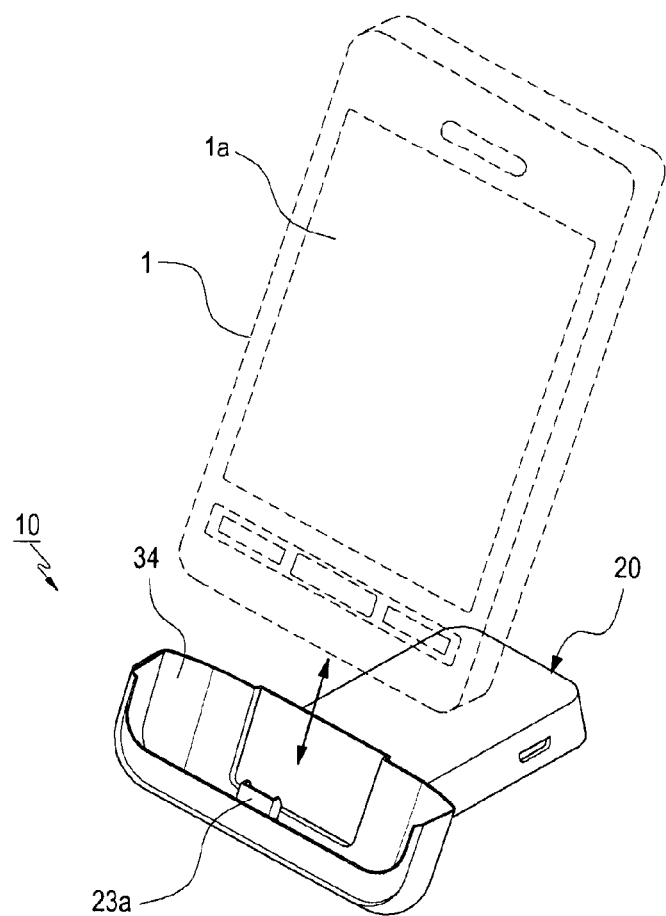
FIG. 3 is a perspective view showing a coupled state of a docking station for a portable communication device according to an exemplary embodiment of the present invention.

As shown in FIGS. 2 and 3, the guide portion 30 is coupled with the cradling portion 23 of the body portion 20 and passes the connecting terminal 23a formed in the cradling portion 23 through the terminal through-hole 33 formed in the guide portion 30, such that the connecting terminal 23a is electrically connected with the interface (not shown) of the portable communication device 1 coupled with the guide portion 30.

As shown in FIG. 3, the guide portion 30 with which the portable communication device 1 is coupled is inclinedly cradled on the cradling portion 23 of the body portion 20. In this state, the user can watch a movie and listen to the music through a display unit 1a of the portable communication device 1, and the portable communication device 1 is electrically connected with another external device (not shown) such as a charging device, an external memory device, a local printer, or the like.

As shown in FIGS. 3 and 4, to separate the portable terminal communication 1 from the docking station 10, the guide portion 30 is separated from the cradling portion 23 of the body portion 20. In this case, the interface of the portable communication device 1 is separated from the connecting terminal 23a of the body portion 20. At this time, as shown in FIGS. 4 and 5, the coupling portion 31 of the guide portion 30 leaves the coupling groove 21 of the body portion 20. In this state, as shown in FIG. 3, the portable communication device 1 is separated from the guide portion 30.

When the exterior of the portable communication device 1 has another shape, the guide portion 30 is provided to fit the exterior shape of the portable communication device 1.

As such, by providing the detachable guide portion 30 for separating or coupling the portable communication device 1 from or to the docking station 10, portable communication devices having various exterior shapes can be used through the single docking station 10. Moreover, by providing the cradling portion 23 for allowing portable communication devices having various exterior shapes to be directly mounted to or dismounted from the single docking station 10, the portable communication devices having various exterior shapes can be used and thus efficiency in using a product can be improved. That is, the present invention discloses that one docking station is detachably coupled to the guide portion (30) which is coupled to the portable communication device. If a portable communication device having other exterior shape is used, another guide portion fitting the exterior shape of the portable communication device is fitted and detachably coupled to the docking station.

Figure 6:
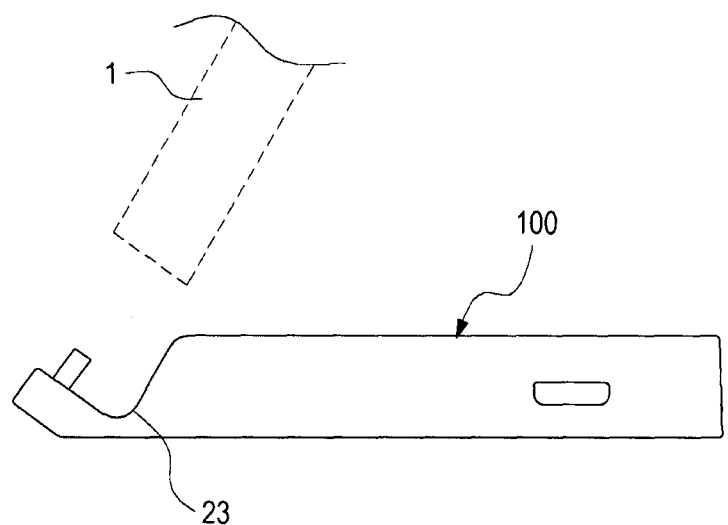
FIG. 6 is a side cross-sectional view showing another exemplary embodiment of a docking station for a portable communication device according to an exemplary embodiment of the present invention.

As shown in FIG. 4, the docking station 10 may include a body portion having a front portion and a rear portion, the front portion including a first wall (W1) facing a sidewall of the rear portion, the first wall (W1) being arranged together with the sidewall of the rear portion to form a cradle. The front portion may further include a second wall running substantially in parallel with the first wall (W1) and a third wall (W3) connecting the first wall (W1) to the second wall (W2). The first wall (W1), the second wall (W2), and the third wall (W3), may be at least partially inserted into the guide portion FIG. 6 illustrates another exemplary embodiment of the docking station. As shown, the docking station (100) consists of a body portion (20) of the docking station comprising the cradling portion (23), which is detachably coupled to the portable communication device (1) and formed to fit various exterior shape without the particular guide portion (30, shown in FIGS. 2 and 4).

It will be obvious to those of ordinary skill in the art that a docking station for a portable communication device according to the present invention described above is not limited by the foregoing embodiment and drawings, and various substitutions, modifications, and changes can be made in terminals having various exterior shapes such as a sliding type, a swing type, a waterproof terminal, and so forth.

What is claimed is:

1. A docking station for a portable communication device, comprising:
   a body portion having a front portion and a rear portion, the front portion including a first wall facing a sidewall of the rear portion, the first wall being arranged together with the sidewall of the rear portion to form a cradle; and
   a guide portion, detachably coupled to the body portion, for adoptively housing and detachably coupling to the portable communication device, the guide portion having a first recess that accommodates inside, at least in part, the front portion,
   wherein the body portion includes a second recess formed in the sidewall of the rear portion and a top wall of the rear portion, and the second recess includes at least one coupling groove formed in a wall of the second recess, and
   wherein the guide portion includes a coupling portion that extends from a rear surface of the guide portion, and the coupling portion includes at least one coupling protrusion that is vertically inserted into the at least one coupling groove.

2. The docking station of claim 1, wherein the guide portion is inclinedly cradled inside the cradle when the body portion is coupled to the guide portion.

3. The docking station of claim 1, wherein the cradle is formed substantially in a V-shape, and the cradle comprises a connecting terminal for electric connection with an interface of the portable communication device.

4. The docking station of claim 3, wherein the guide portion comprises a terminal through-hole which allows the connecting terminal to pass therethrough.

5. The docking station of claim 4, wherein the terminal through-hole allows the portable communication device, while positioned in the guide portion, to be mounted on or dismounted from the body portion.

6. A docking station for a portable communication device, comprising:
   a body portion having a top surface and a first and a second sidewall adjacent to said top surface, the top surface having a first inclined portion and a second inclined portion that face each other and form a cradle, the body portion having a first recess formed in the second inclined portion and a third portion of the top surface, the first recess including at least one coupling groove formed in a wall of the first recess; and
   a guide portion, detachably coupled to the body portion, for adoptively housing the portable communication device, the guide portion having a second recess that accommodates inside at least a part of the first inclined portion, the guide portion further having a coupling portion that extends from a rear surface of the guide portion, the coupling portion including at least one coupling protrusion that is vertically inserted into the at least one coupling groove,
   wherein said cradle extends laterally from said first sidewall to said second sidewall, and wherein said cradle is situated beneath a plane of the third portion of the top surface, the first inclined portion and the second inclined portion being inclined relative to the third portion of the top surface.

7. The docking station of claim 6, wherein the guide portion accepts the portable communication device.

8. The docking station of claim 1, wherein the guide portion and the body portion are disposed along a longitudinal axis of the docking station, such that the body portion is posterior with respect to at least some of the guide portion.

9. The docking station of claim 6, wherein the guide portion and the body portion are disposed along a longitudinal axis of the docking station, such that the body portion is posterior with respect to at least some of the guide portion.

10. The docking station of claim 1, wherein:
    the front portion further includes a second wall running substantially in parallel with the first wall and a third wall connecting the first wall to the second wall,
    the first wall, the second wall, and the third wall are accommodated, at least in part, inside the first recess of the guide portion,
    the first wall and the second wall of the front portion extend towards a plane of the top wall of the rear portion, and
    the first wall, the second wall, and the third wall, are at least partially inserted into the guide portion.

11. The docking station of claim 1, wherein a first part of the guide portion is set in the cradle between the sidewall of the rear portion and the first wall of the front portion and a second part of the guide portion is located outside of the cradle.

* * * * *